(12) United States Patent
Oketani

(10) Patent No.: US 7,131,731 B2
(45) Date of Patent: Nov. 7, 2006

(54) PROJECTION TYPE VIDEO DISPLAY APPARATUS

(75) Inventor: Kazunobu Oketani, Yawata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/857,357

(22) Filed: Jun. 1, 2004

(65) Prior Publication Data

US 2005/0030485 A1 Feb. 10, 2005

(30) Foreign Application Priority Data

Jun. 2, 2003 (JP) .............................. 2003-156445

(51) Int. Cl.
*G03B 21/18* (2006.01)
(52) U.S. Cl. .......................... 353/57; 353/85
(58) Field of Classification Search .................. 353/52, 353/57–58, 60, 85
See application file for complete search history.

(56) References Cited

U.S. PATENT DOCUMENTS

| | | | | |
|---|---|---|---|---|
| 4,283,658 A | * | 8/1981 | Parker | 353/57 |
| 6,634,757 B1 | * | 10/2003 | Asakawa | 353/85 |
| 6,816,141 B1 | * | 11/2004 | Fergason | 345/88 |
| 2005/0007306 A1 | * | 1/2005 | Ilsaka et al. | 345/32 |
| 2005/0094110 A1 | * | 5/2005 | Nakamura | 353/85 |

FOREIGN PATENT DOCUMENTS

| | | |
|---|---|---|
| JP | 3-179886 | 8/1991 |
| JP | 6-160811 | 6/1994 |
| JP | 2002-72170 | 3/2002 |
| JP | 2002300498 A * | 10/2002 |

* cited by examiner

*Primary Examiner*—Christopher Mahoney
(74) *Attorney, Agent, or Firm*—Westerman, Hattori, Daniels & Adrian, LLP.

(57) ABSTRACT

In a projection type video display apparatus comprising a light source lamp and a light valve for controlling the intensity of output light of the light source lamp, a projection type video display apparatus comprises a light source lamp cooling fan for cooling the light source lamp; judgment means for judging the brightness of an image on the basis of an image signal; first control means for controlling the luminescent intensity of the light source lamp on the basis of the results of the judgment by the judgment means; and second control means for controlling the rotational speed of the light source lamp cooling fan on the basis of the results of the judgment by the judgment means, the first control means controlling the luminescent intensity of the light source lamp such that the brighter the image is, the higher the luminescent intensity of the light source lamp becomes, and the second control means controlling the rotational speed of the light source lamp cooling fan such that the brighter the image is, the higher the rotational speed of the light source lamp cooling fan becomes.

4 Claims, 4 Drawing Sheets

PROJECTION TYPE VIDEO DISPLAY APPARATUS

BACKGROUND OF THE INVENTION

1. Field of the Invention

The present invention relates to a projection type video display apparatus such as an LCD (Liquid Crystal Display) projector or a DLP (Digital Light Processor) projector.

2. Description of the Background Art

In projection type video display apparatuses utilizing display devices such as LCDs and DLPs as light valves, a system for controlling the brightness of a light source lamp depending on the characteristics of an image to be displayed to improve a visual contrast feeling has been proposed. Specifically, a system for detecting the peak value of an image signal or the average video level of the image signal, to judge the characteristics of an image and control the brightness of a light source lamp depending on the results of the judgment has already been developed (see JP-A-06-160811 and JP-A-03-179886).

Furthermore, as a system for controlling the light source lamp within the projection type video display apparatus and a cooling fan for cooling optical components and so on, a method of sensing the internal and external temperatures of the projection type video display apparatus using a temperature sensor and controlling the rotational speed of the cooling fan on the basis of the sensed temperature has already been developed (see JP-A-2002-72170).

As the light source lamp in the projection type video display apparatus, ultra-high pressure mercury lamps called a UHP (Ultra High Pressure) lamp and a UHE (Ultra High Efficient) lamp have been generally used. The lamps are characterized in that they have high luminescent efficiency. In order to maintain the high luminescent efficiency of the lamp as well as to keep the life thereof long, however, it is important to manage the temperature of a luminescent portion. In an example of a certain lamp, a burner must be managed such that the temperature thereof is 950±50°. Even if the temperature is increased or reduced too much, the life is liable to be shortened.

In a general projection type video display apparatus, the brightness of the light source lamp is always kept constant. By fixing the rotational speed of the cooling fan for cooling the light source lamp to the most suitable value depending on the internal and external temperatures of the projection type video display apparatus, therefore, the temperature of the luminescent portion can be relatively simply managed.

On the other hand, in the projection type video display apparatus for controlling the brightness of the light source lamp depending on the characteristics of an image to be displayed, when the rotational speed of the cooling fan for cooling the light source lamp is fixed depending on the internal and external temperatures of the projection type video display apparatus, cooling is insufficient in a case where the light source lamp is controlled in the direction in which it is brightened, while being excessive in a case where it is controlled in the direction in which it is darkened, thereby causing the life of the light source lamp to be shortened.

SUMMARY OF THE INVENTION

An object of the present invention is to provide, in a projection type video display apparatus that controls the brightness of a light source lamp depending on the characteristics of an image to be displayed, a projection type video display apparatus capable of keeping the life of the light source lamp long.

In a projection type video display apparatus comprising a light source lamp and a light valve for controlling the intensity of output light of the light source lamp, a first projection type video display apparatus according to the present invention is characterized by comprising a light source lamp cooling fan for cooling the light source lamp; judgment means for judging the brightness of an image on the basis of an image signal; first control means for controlling the luminescent intensity of the light source lamp on the basis of the results of the judgment by the judgment means; and second control means for controlling the rotational speed of the light source lamp cooling fan on the basis of the results of the judgment by the judgment means, the first control means controlling the luminescent intensity of the light source lamp such that the brighter the image is, the higher the luminescent intensity of the light source lamp becomes, and the second control means controlling the rotational speed of the light source lamp cooling fan such that the brighter the image is, the higher the rotational speed of the light source lamp cooling fan becomes.

In a projection type video display apparatus comprising a light source lamp and a light valve for controlling the intensity of output light of the light source lamp, a second projection type video display apparatus according to the present invention is characterized by comprising a light source lamp cooling fan for cooling the light source lamp; a judgment circuit for judging the brightness of an image on the basis of an image signal; a first control circuit for controlling the luminescent intensity of the light source lamp on the basis of the results of the judgment by the judgment circuit; and a second control circuit for controlling the rotational speed of the light source lamp cooling fan on the basis of the results of the judgment by the judgment circuit, the first control circuit controlling the luminescent intensity of the light source lamp such that the brighter the image is, the higher the luminescent intensity of the light source lamp becomes, and the second control circuit controlling the rotational speed of the light source lamp cooling fan such that the brighter the image is, the higher the rotational speed of the light source lamp cooling fan becomes.

In a projection type video display apparatus comprising a light source lamp and a light valve for controlling the intensity of output light of the light source lamp, a third projection type video display apparatus according to the present invention is characterized by comprising a light source lamp cooling fan for cooling the light source lamp; a temperature sensor for sensing the peripheral temperature of the main body of the projection type video display apparatus or the internal temperature of the main body of the projection type video display apparatus; judgment means for judging the brightness of an image on the basis of an image signal; first control means for controlling the luminescent intensity of the light source lamp on the basis of the results of the judgment by the judgment means; and second control means for controlling the rotational speed of the light source lamp cooling fan on the basis of the results of the judgment by the judgment means and the temperature sensed by the temperature sensor, the first control means controlling the luminescent intensity of the light source lamp such that the brighter the image is, the higher the luminescent intensity of the light source lamp becomes, and the second control means controlling the rotational speed of the light source lamp cooling fan such that the brighter the image is, the higher the rotational speed of the light source lamp cooling fan becomes, and the higher the temperature sensed by the temperature sensor is, the higher the rotational speed of the light source lamp cooling fan becomes.

In a projection type video display apparatus comprising a light source lamp and a light valve for controlling the intensity of output light of the light source lamp, a fourth projection type video display apparatus according to the present invention is characterized by comprising a light source lamp cooling fan for cooling the light source lamp; a temperature sensor for sensing the peripheral temperature of the main body of the projection type video display apparatus or the internal temperature of the main body of the projection type video display apparatus; a judgment circuit for judging the brightness of an image on the basis of an image signal; a first control circuit for controlling the luminescent intensity of the light source lamp on the basis of the results of the judgment by the judgment circuit; and a second control circuit for controlling the rotational speed of the light source lamp cooling fan on the basis of the results of the judgment by the judgment circuit and the temperature sensed by the temperature sensor, the first control circuit controlling the luminescent intensity of the light source lamp such that the brighter the image is, the higher the luminescent intensity of the light source lamp becomes, and the second control circuit controlling the rotational speed of the light source lamp cooling fan such that the brighter the image is, the higher the rotational speed of the light source lamp cooling fan becomes, and the higher the temperature sensed by the temperature sensor is, the higher the rotational speed of the light source lamp cooling fan becomes.

The foregoing and other objects, features, aspects and 0dvantages of the present invention will become more apparent from the following detailed description of the present invention when taken in conjunction with the accompanying drawings

DESCRIPTION OF THE PREFERRED EMBODIMENTS

Figure 1:
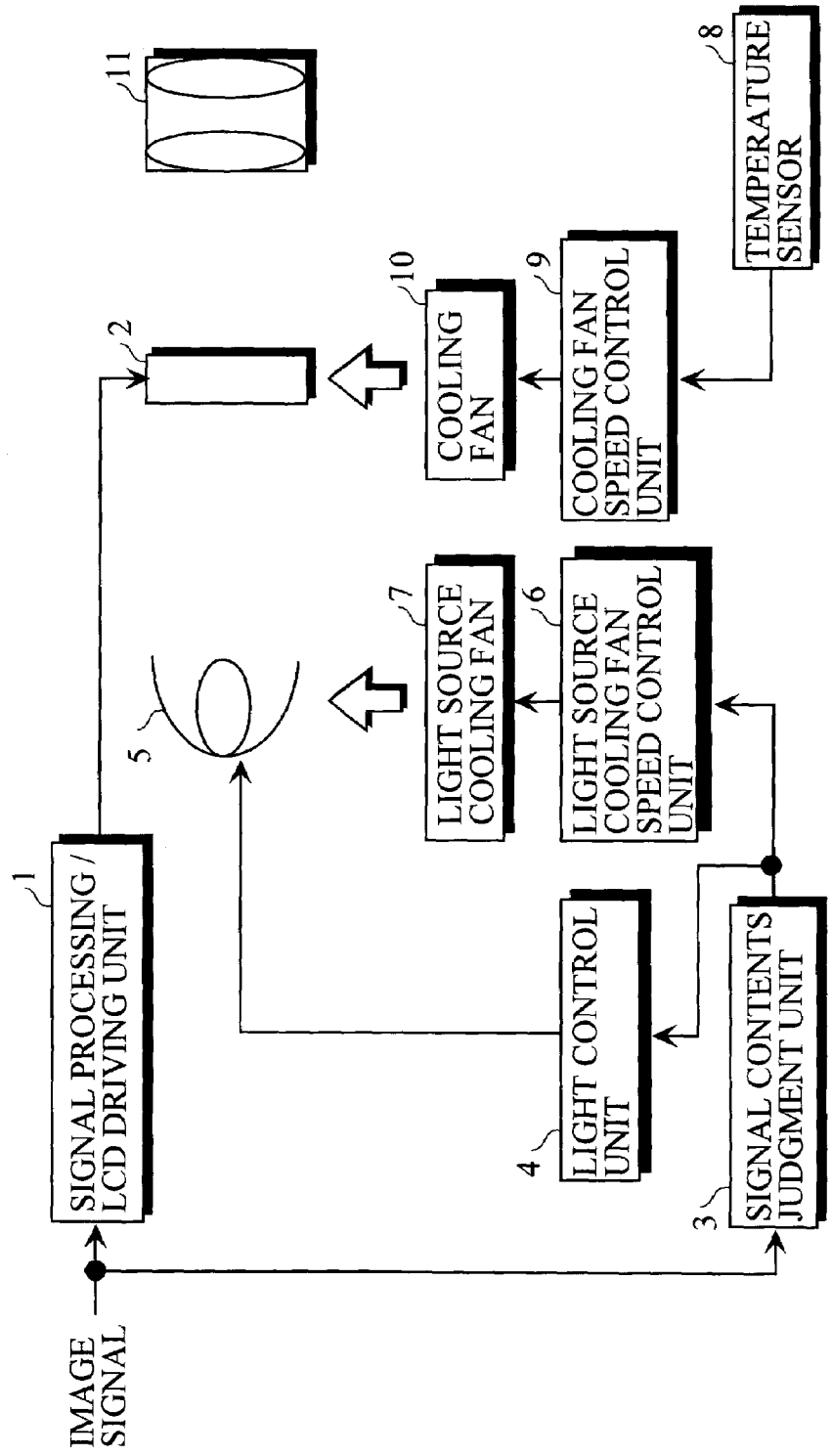
FIG. 1 is a block diagram showing the configuration of a liquid crystal projector according to a first embodiment.

Referring now to the drawings, description is made of an embodiment in a case where the present invention is applied to a liquid crystal projector.

[1] Description of First Embodiment

FIG. 1 illustrates the configuration of a liquid crystal projector.

An image signal is fed to an LCD 2 through a signal processing/LCD driving unit 1. A light source lamp 5 is arranged behind the LCD 2, and a projection lens 11 is arranged in front of the LCD 2. A light source cooling fan 7 is arranged in the vicinity of the light source lamp 5, and a cooling fan 10 different from the light source cooling fan 7 is arranged in the vicinity of the LCD 2.

The image signal is also fed to a signal contents judgment unit 3. The signal contents judgment unit 3 calculates the APL (Average Power Level) of the whole of a display screen from a display image signal, for example, and judges the brightness of an image on the basis of the calculated APL. In this example, the signal contents judgment unit 3 judges which of ranges of predetermined eight brightness levels corresponds to the brightness of the image, and gives the results of the judgment to a light control unit 4 and a light source cooling fan speed control unit 6.

The light control unit 4 controls the luminescent intensity of the light source lamp 5 depending on the results of the judgment given from the signal contents judgment unit 3. That is, the light control unit 4 controls the luminescent intensity of the light source lamp 5 such that the brighter the image is, the higher the luminescent intensity of the light source lamp 5 becomes.

Figure 2:
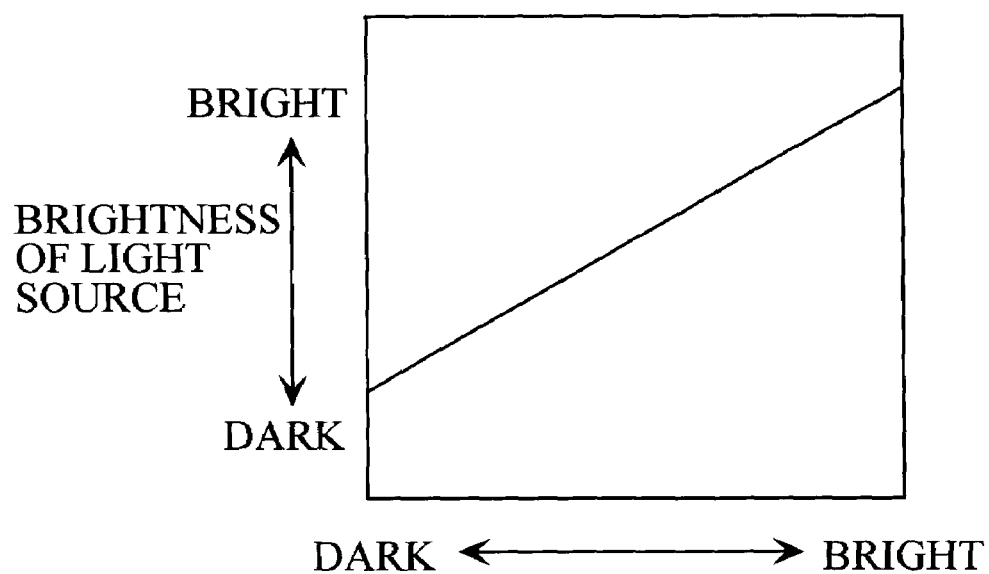
FIG. 2 is a graph showing an example of the relationship between the brightness of an image and the brightness of a light source.
Figure 3:
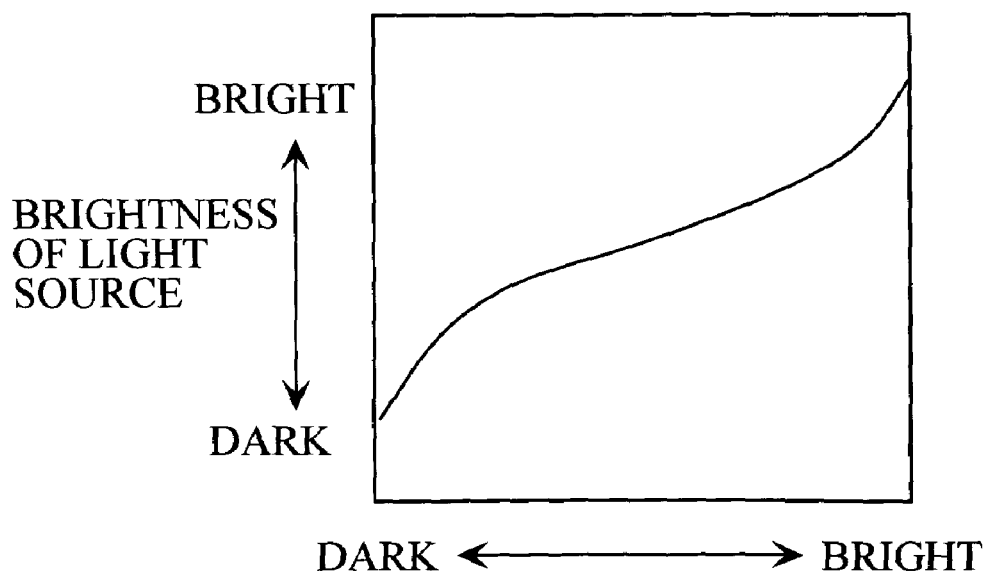
FIG. 3 is a graph showing another example of the relationship between the brightness of an image and the brightness of a light source.
Figure 4:
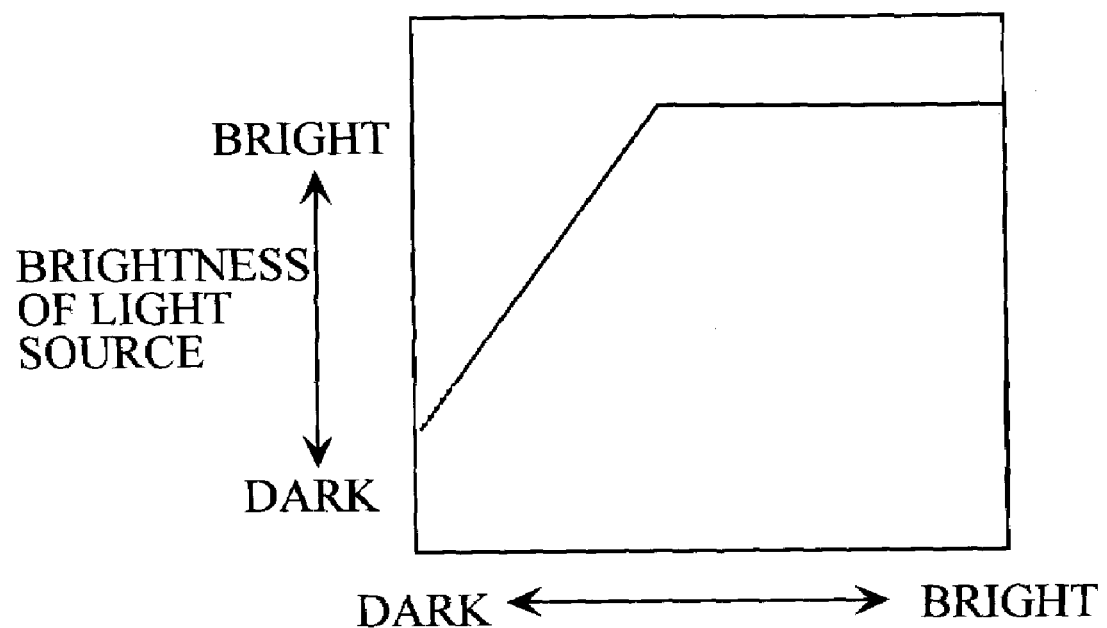
FIG. 4 is a graph showing still another example of the relationship between the brightness of an image and the brightness of a light source.

The relationship between the brightness of the image and the brightness of the light source (the luminescent intensity of the light source lamp 5) may be set to a linear relationship, as shown in FIG. 2, or may be set to a non-liner relationship, as shown in FIG. 3. Further, as shown in FIG. 4, the relationship between the brightness of the image and the brightness of the light source may be set to a linear relationship until the brightness of the image becomes a predetermined value, and may be set to such a relationship that the brightness of the light source is kept constant when the brightness of the image is not less than the predetermined value.

The light source cooling fan speed control unit 6 controls the rotational speed of the light source cooling fan 7 depending on the results of the judgment given from the signal contents judgment unit 3. That is, the light source cooling fan speed control unit 6 controls the rotational speed of the light source cooling fan 7 such that the brighter the image is, the higher the rotational speed of the light source cooling fan 7 becomes.

The relationship between the brightness of the image and the rotational speed of the light source cooling fan 7 is set such that the temperature of a luminescent portion of the light source lamp 5 is kept in the suitable range in consideration of the relationship between the brightness of the image and the brightness of the light source (the luminescent intensity of the light source lamp 5) and the relationship between the brightness of the light source lamp 5 and the temperature of the luminescent portion.

A cooling fan 10 different from the light source cooling fan 7 is controlled by a cooling fan speed control unit 9. A sensing signal of a temperature sensor 8 for sensing the internal temperature of the main body of the liquid crystal projector is inputted to the cooling fan speed control unit 9. The cooling fan speed control unit 9 controls the rotational speed of the cooling fan 10 on the basis of the internal temperature of the main body of the liquid crystal projector which is sensed by the temperature sensor 8. That is, the cooling fan speed control unit 9 controls the rotational speed of the cooling fan 10 such that the higher the internal temperature of the main body of the liquid crystal projector is, the higher the rotational speed of the cooling fan 10 becomes.

The temperature sensor 8 may be replaced with a temperature sensor for sensing the peripheral temperature of the main body of the liquid crystal projector.

[2] Description of Second Embodiment

Figure 5:
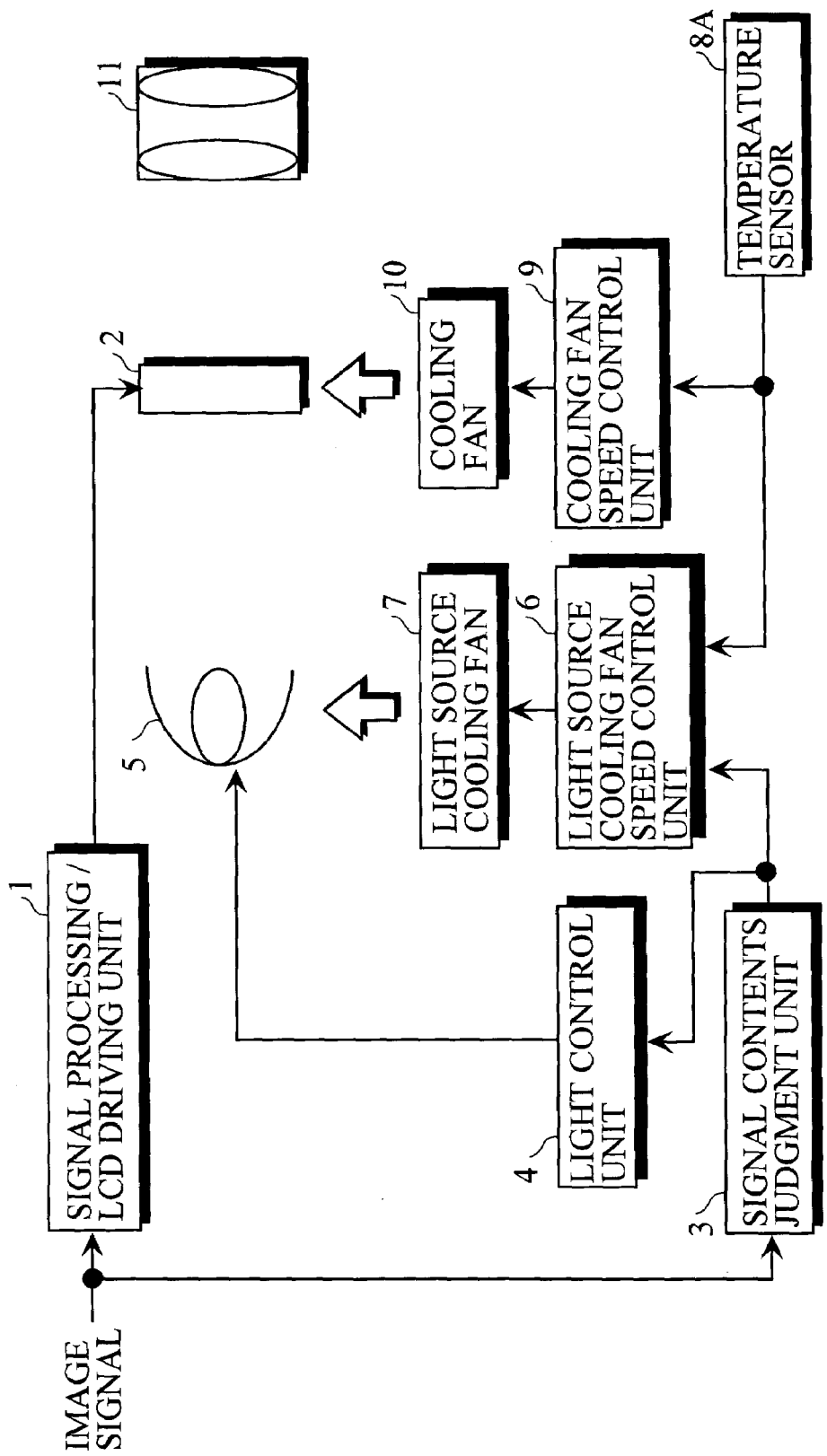
FIG. 5 is a block diagram showing the configuration of a liquid crystal projector according to a second embodiment.

FIG. 5 illustrates the configuration of a liquid crystal projector. In FIG. 5, the same units as those shown in FIG. 1 are assigned the same reference numerals and hence, the description thereof is not repeated.

In this example, used as a temperature sensor 8A is one for sensing the peripheral temperature of the main body of the liquid crystal projector. A sensing signal of the temperature sensor 8A is inputted to a cooling fan speed control unit 9, and is also inputted to a light source cooling fan speed control unit 6.

The cooling fan speed control unit 9 controls the rotational speed of a cooling fan 10 on the basis of the peripheral temperature of the main body of the liquid crystal projector which is sensed by the temperature sensor 8A. That is, the cooling fan speed control unit 9 controls the rotational speed of the cooling fan 10 such that the higher the peripheral temperature of the main body of the liquid crystal projector is, the higher the rotational speed of the cooling fan 10 becomes.

The light source cooling fan speed control unit 6 controls the rotational speed of a light source cooling fan 7 on the basis of the results of judgment given from a signal contents judgment unit 3 and the peripheral temperature of the main body of the liquid crystal projector which is sensed by the temperature sensor 8A. That is, the light source cooling fan speed control unit 6 controls the rotational speed of the light source cooling fan 7 such that the brighter the image is, the higher the rotational speed of the light source cooling fan 7 becomes, and the higher the peripheral speed of the main body of the liquid crystal projector is, the higher the rotational speed of the light source cooling fan 7 becomes.

That is, the light source cooling fan speed control unit 6 controls the rotational speed of the light source cooling fan 7 also in consideration of the peripheral temperature of the main body of the liquid crystal projector in addition to the brightness of the image.

Specifically, temperature ranges which the peripheral temperature of the main body of the liquid crystal projector can take are classified into a plurality of levels, and a table representing the relationship between the results of the judgment of the brightness of the image and the rotational speed of the light source cooling fan 7 is prepared for each of the temperature levels. The rotational speed of the light source cooling fan 7 is determined on the basis of the table corresponding to the peripheral temperature of the main body of the liquid crystal projector which is sensed by the temperature sensor 8A and the results of the judgment of the brightness of the image.

The temperature sensor 8A may be replaced with a temperature sensor for sensing the internal temperature of the main body of the liquid crystal projector.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a projection type video display apparatus comprising a light source lamp and a light valve for controlling the intensity of output light of the light source lamp,
   a projection type video display apparatus comprising:
   a light source lamp cooling fan for cooling the light source lamp;
   judgment means for judging the brightness of an image on the basis of an image signal;
   first control means for controlling the luminescent intensity of the light source lamp on the basis of the results of the judgment by the judgment means; and
   second control means for controlling the rotational speed of the light source lamp cooling fan on the basis of the results of the judgment by the judgment means,
   the first control means controlling the luminescent intensity of the light source lamp such that the brighter the image is, the higher the luminescent intensity of the light source lamp becomes, and
   the second control means controlling the rotational speed of the light source lamp cooling fan such that the brighter the image is, the higher the rotational speed of the light source lamp cooling fan becomes.

2. In a projection type video display apparatus comprising a light source lamp and a light valve for controlling the intensity of output light of the light source lamp,
   a projection type video display apparatus comprising:
   a light source lamp cooling fan for cooling the light source lamp;
   a judgment circuit for judging the brightness of an image on the basis of an image signal;
   a first control circuit for controlling the luminescent intensity of the light source lamp on the basis of the results of the judgment by the judgment circuit; and
   a second control circuit for controlling the rotational speed of the light source lamp cooling fan on the basis of the results of the judgment by the judgment circuit,
   the first control circuit controlling the luminescent intensity of the light source lamp such that the brighter the image is, the higher the luminescent intensity of the light source lamp becomes, and
   the second control circuit controlling the rotational speed of the light source lamp cooling fan such that the brighter the image is, the higher the rotational speed of the light source lamp cooling fan becomes.

3. In a projection type video display apparatus comprising a light source lamp and a light valve for controlling the intensity of output light of the light source lamp,
   a projection type video display apparatus comprising:
   a light source lamp cooling fan for cooling the light source lamp;
   a temperature sensor for sensing the peripheral temperature of the main body of the projection type video display apparatus or the internal temperature of the main body of the projection type video display apparatus;
   judgment means for judging the brightness of an image on the basis of an image signal;
   first control means for controlling the luminescent intensity of the light source lamp on the basis of the results of the judgment by the judgment means; and
   second control means for controlling the rotational speed of the light source lamp cooling fan on the basis of the results of the judgment by the judgment means and the temperature sensed by the temperature sensor,
   the first control means controlling the luminescent intensity of the light source lamp such that the brighter the image is, the higher the luminescent intensity of the light source lamp becomes, and
   the second control means controlling the rotational speed of the light source lamp cooling fan such that the brighter the image is, the higher the rotational speed of the light source lamp cooling fan becomes, and the higher the temperature sensed by the temperature sensor is, the higher the rotational speed of the light source lamp cooling fan becomes.

4. In a projection type video display apparatus comprising a light source lamp and a light valve for controlling the intensity of output light of the light source lamp, a projection type video display apparatus comprising:
- a light source lamp cooling fan for cooling the light source lamp;
- a temperature sensor for sensing the peripheral temperature of the main body of the projection type video display apparatus or the internal temperature of the main body of the projection type video display apparatus;
- a judgment circuit for judging the brightness of an image on the basis of an image signal;
- a first control circuit for controlling the luminescent intensity of the light source lamp on the basis of the results of the judgment by the judgment circuit; and
- a second control circuit for controlling the rotational speed of the light source lamp cooling fan on the basis of the results of the judgment by the judgment circuit and the temperature sensed by the temperature sensor,
- the first control circuit controlling the luminescent intensity of the light source lamp such that the brighter the image is, the higher the luminescent intensity of the light source lamp becomes, and
- the second control circuit controlling the rotational speed of the light source lamp cooling fan such that the brighter the image is, the higher the rotational speed of the light source lamp cooling fan becomes, and the higher the temperature sensed by the temperature sensor is, the higher the rotational speed of the light source lamp cooling fan becomes.

* * * * *